Figure 1:
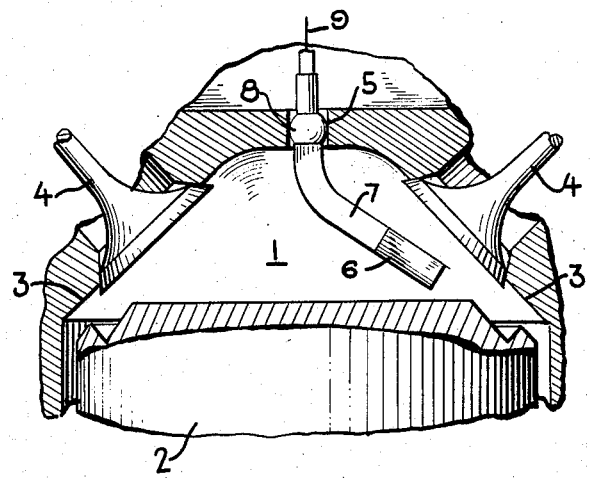

Feb. 9, 1960  J. J. GIAMMARIA  2,924,542
METHOD FOR REMOVING COMBUSTION CHAMBER DEPOSITS
Filed Sept. 9, 1957

INVENTOR
John J. Giammaria
BY
Hastings S. Trigg
ATTORNEY

United States Patent Office 2,924,542
Patented Feb. 9, 1960

2,924,542

METHOD FOR REMOVING COMBUSTION CHAMBER DEPOSITS

John J. Giammaria, Woodbury, N.J., assignor to Socony Mobil Oil Company, Inc., a corporation of New York Application September 9, 1957, Serial No. 682,830

8 Claims. (Cl. 134—1)

This invention relates to a method for removing combustion chamber deposits. It is more particularly concerned with a method for removing combustion chamber deposits from inside the combustion chamber of an internal combustion engine by means of high frequency vibrations.

As is well known to those familiar with the art, combustion chamber deposits raise the octane requirement of a gasoline engine. For example, an automobile with an engine having clean combustion chambers may operate on 90 O.N. gasoline without knocking. After it has been in operation over a period of 3000 to 5000 miles of driving, deposits will build up in the combustion chambers to an extent that a fuel having an octane number as high as 98 will be required for knock-free performance. Frequently, a new car that operates well on regular grade motor gasoline will require more expensive premium fuels, after it has been in operation sufficiently long to build up deposits in the combustion chambers. The presence of deposits in a combustion chamber can also give rise to pre-ignition troubles.

If the combustion deposits can be removed from the engine, it will be restored to its original lower octane requirement. Various methods have been proposed to remove such deposits, without dismantling the engine. It has been proposed to introduce a suitable solvent into each cylinder through the spark plug hole, allowing it to soak for a period of time, and then blowing loosened deposit and solvent through the exhaust. Another method involves blasting the walls of the combustion chambers with rice or ground walnut shells, and blowing the loosened deposits out the exhaust. Such methods, however, are somewhat time-consuming and contribute to air polution in the area of use.

It has now been found that combustion chamber deposits can be removed quickly and efficiently. It has been discovered that deposits can be removed from the combustion chambers of an internal combustion engine by means of high frequency mechanical vibrations operating in a suitable liquid medium.

Accordingly, it is an object of this invention to provide a simple method for removing combustion chamber deposits. Another object is to provide a method for removing combustion chamber deposits that is quick and efficient and which does not contribute to air pollution. A specific object is to provide a method for removing deposits from the combustion chambers of an internal combustion engine that involves the use of high frequency mechanical vibrations opearting in a liquid medium.

Figure 2:
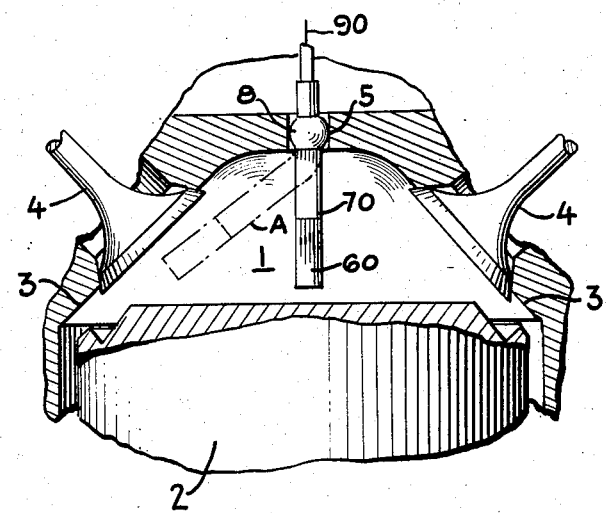

Other objects and advantages of this invention will become apparent to those skilled in the art from the following detailed description, considered in conjunction with the drawings, wherein:

Figure 1 presents a diagrammatic representation of an embodiment of the process of this invention; and Fig. 2 presents a diagrammatic representation of another embodiment of the process of this invention.

The present invention provides a method for removing deposits from the combustion chambers of an internal combustion engine that comprises filling said chamber with a liquid, introducing high frequency mechanical vibrations into said liquid thereby loosening said deposits and suspending them in said liquid, and removing said liquid and deposits from the combustion chamber.

The source of high frequency mechanical vibrations used in the method of this invention is a transducer. The transducer can be composed of any material known in the art that undergoes dimensional change under the influence of high frequency alternating electrical current of high potential. The frequency of dimensional change is proportional to the imposed voltage. One type of transducer utilizable is made of piezo-electric material, such as quartz and pre-polarized barium titanate. Another type, known as the magnetostrictive type, is composed of bars or rods of certain alloys of nickel, iron, and cobalt placed with the longitudinal axis parallel to a magnetic field.

When a transducer is immersed in a liquid medium and activated by applied voltage, its rapid change in dimension sets up high frequency vibrations that are transmitted through the liquid to the surface to be cleaned. The piezo-electric type transducer sets up lateral or longitudinal vibrations. The magnetostrictive type sets up vibrations in a longitudinal direction. Either type is utilizable in the present method. Indeed, for thorough cleaning it is often desirable to employ both types.

The power that is applied to the transducer will vary between about 25 watts and about 1000 watts per sq. in., preferably, between about 50 watts and about 400 watts. The input current is adjusted to effect the desired frequency of vibration. In general, the vibration frequency will vary between about 5 kilocycles and about 200 kilocycles. Ordinarily the frequency will be between about 10 kc. and about 50 kc. The power input and the frequency of vibration will depend upon the type of transducer used.

The vibrations reach the surfaces to be cleaned, through a suitable liquid that is placed in the combustion chamber. Any material that is liquid at ambient temperatures and is not corrosive to the metal surfaces can be used. In preferred practice, the liquid should have a density of one or more. Non-limiting examples of suitable liquids are water, carbon tetrachloride, chlorobenzene, benzene, xylene, dimethyl formamide, and the like.

The liquid medium can contain surface-active agents, in order to disperse the dislodged deposit particles throughout. The detergent, of course, must be soluble in the selected liquid. Non-limiting examples of suitable additives are alkali and amine salts of alkyl benzene or naphthalene sulfonic acids; alkali alkyl sulfates; non-ionic detergents, e.g. sorbitan oleate; and the like. Relatively small concentrations of surface-active agents are necessary, ordinarily between about 0.01 percent and about 1 percent, by weight.

Figure 1 presents a diagrammatic representation of an embodiment of the method of this invention. There is represented therein a typical internal combustion engine combustion chamber 1, defined by the piston 2, the cylinder walls 3, and the closed valves 4. In operation, the spark plug is removed from the spark plug hole 5. The piston 2 is placed on the compression stroke in a position below top dead center, e.g., 90° to 45°. The chamber 1 is then filled with liquid up to the lower edge of the valve ports. An exciter unit comprising a transducer 6 capable of vibrating laterally, mounted upon a conductor 7 provided with a swivel connector 8, is inserted into the spark plug hole 5. The swivel connector 8 is adapted to serve the dual purpose of permitting rotation of the transducer 6 within the chamber and seals off the spark plug hole 5. The transducer 6 and the conductor 7 are of a diameter substantially smaller than that of the spark plug hole 5, The piston 2 is then raised to top dead center, thereby filling the combustion chamber 1 with liquid.

Variations in this procedure can be used. For example, the transducer unit can be inserted into the combustion chamber after the piston has been raised to top dead center. Another procedure would involve filling the chamber with liquid with the piston at top dead center, and then inserting the transducer unit. Another operation would involve cleaning the lower combustion chamber, by applying vibrations as described hereinbelow, while the piston is still off dead center. Subsequently the piston can be raised to top dead center, to clean the upper combustion chamber.

Electrical power from a generator and power control unit (not shown) is introduced into the transducer 6 through a wire 9 and the conductor 7. The power input is adjusted to activate the transducer to vibrate laterally. The transducer is rotated slowly about the combustion chamber, in order to expose all surfaces to high frequency vibration. Then, the transducer 6 is slowly raised and withdrawn through the spark plug hole 5, still being slowly rotated. For the average amount of combustion deposit, the opertaion will take between about 1 minute and about 15 minutes per combustion chamber. More severe deposit conditions, of course, require a longer period of exposure. It has been found that the transducer 6 must come well within one inch of each surface of the combustion chamber 1, and preferably within ¼ to ½ inch. Accordingly, in some cases, the central portion of the piston crown and the lower edges of the cylinder walls may not be completely cleaned. This situation can be remedied by the operation presented in Fig. 2.

In Fig. 2, like parts bear the same number designation as its corresponding part in Fig. 1. The operation shown in Fig. 2 can be supplementary to that of Fig. 1, or it can be a sole operation. In supplementary type operation, after the operation of Fig. 1 is complete, another excitor unit is inserted through the spark plug hole 5. This comprises a transducer 60 mounted on a straight conductor 70 and provided with a swivel joint 8. The transducer 60, in this case, is adapted to vibrate lengthwise, e.g., a magnetostrictive transducer. Thus it directs the vibrations from the end, i.e., longitudinally. The swivel joint 8 serves to seal the spark plug hole 5 and to permit movement of the transducer 60. Power of the proper intensity is supplied through a wire 90, from the generator and control unit (not shown). Then the transducer 60 is moved about, so that it is directed to all parts of the crown of the piston 2 and to the lower edges of the cylinder walls 3, as for example position A of Fig. 2.

As mentioned hereinbefore, the operation of Fig. 2 can be the sole operation. In this case, the combustion chamber is filled with liquid as was described in conjunction with Fig. 1. Then, current is applied and the transducer is moved about the chamber 1. The method relies upon reflected vibrations to clean the upper portion of the combustion chamber 1.

Regardless of the cleaning method used, after cleaning has been completed, the liquid and suspended deposits are siphoned out. Any remaining material will be blown out the exhaust when the motor is started up. The aforedescribed method, or methods, is, of course, repeated for each cylinder.

In order to show that high frequency vibrations are indeed effective to remove typical combustion chamber deposits, a Chevrolet engine was run continuously for 40 hours. A piston that has a heavy buildup of deposits was removed and the top ½ inch was sliced off. This slice was cut into one-inch squares to provide test samples.

*Example 1*

The test equipment used was a Raytheon 200 watt, 10 kilocycle, magnetostrictive oscillator, Model DF–101. This unit consists of a treatment unit and a driver unit. The treatment unit is a metal cup (150 cc. capacity) for holding the sample. The bottom thereof is a vibrating diaphragm attached to a laminated nickel rod, a field coil encased in a stand that holds the rod and cup, and a built-in circulating system for water cooling. An acoustic transformer linkage magnifies the small vibrations of the magnetostrictive rod into relatively large vibrations of the diaphragm. The driver unit is a power supply and an electronic oscillator which is tunable to the resonant frequency of the cup and rod assembly, and of the particular sample.

A specimen was placed face-down in the cup of the magnetostrictive oscillator. Then, 50 cc. water were added and the unit was turned on. The water immediately became cloudy from loosened deposit. After 15 minutes, the unit was shut down and the sample removed. It was completely free of deposit, except for a few specks at the edge.

*Example 2*

Using another specimen, the run of Example 1 was repeated, using 50 cc. carbon tetrachloride as the liquid. The results were the same as in Example 1.

*Example 3*

Runs were made as described in Example 1, except that, instead of resting on the diaphragm, the specimens were suspended by wires at various distances from the diaphragm (the excitor source). It was found that satisfactory cleaning was effected at distances from the vibration source as great as 1 inch. At distances of ¼ and ½ inch, the specimens had the appearance of the cleaned specimen described in Example 1.

From the examples, it will be apparent that high frequency vibrations are effective in removing combustion chamber deposits. Suitable applications of the method of this invention have been discussed.

Although the present invention has been described with preferred embodiments, it is to be understood that modifications and variations may be resorted to, without departing from the spirit and scope of this invention, as those skilled in the art will readily understand. Such variations and modifications are considered to be within the purview and scope of the appended claims.

What is claimed is:

1. A method for removing combustion deposits from the combustion chamber of an internal combustion engine, that comprises filling said chamber with a liquid, introducing high frequency mechanical vibrations that emanate from a transducer introduced into said liquid, thereby loosening said deposits and suspending them in said liquid, and removing said transducer and said liquid and deposits from the combustion chamber.

2. The method defined in claim 1 wherein said liquid is water.

3. The method defined in claim 1 wherein said liquid is carbon tetrachloride.

4. A method for removing combustion deposits from the combustion chambers of an internal combustion engine, that comprises filling said chamber with a liquid; inserting into said chamber and excitor unit comprising a transducer mounted on a conductor, said excitor unit being rotatably mounted; applying power to said transducer, thereby generating high frequency vibrations; rotating said excitor unit about said combustion chamber, thereby loosening said deposits and suspending them in said liquid; and removing said excitor unit and said liquid containing said suspended deposits from the combustion chamber.

5. The method defined in claim 4 wherein said liquid is water.

6. The method defined in claim 4 wherein said liquid is carbon tetrachloride.

7. The method defined in claim 1 wherein the frequency of said high frequency mechanical vibrations varies between about 5 kilocycles and about 200 kilocycles.

8. The method defined in claim 4 wherein the frequency of said high frequency vibrations varies between about 5 kilocycles and about 200 kilocycles.

References Cited in the file of this patent

UNITED STATES PATENTS

| | | |
|---|---|---|
| 1,759,096 | Covert | May 20, 1930 |
| 1,909,200 | Livingstone | May 16, 1933 |
| 2,006,636 | Gerlach | July 2, 1935 |
| 2,047,191 | Buc et al. | July 14, 1936 |
| 2,578,505 | Carlin | Dec. 11, 1951 |
| 2,700,005 | Klingel | Jan. 12, 1955 |
| 2,860,646 | Zucker | Nov. 18, 1958 |

FOREIGN PATENTS

| | | |
|---|---|---|
| 260,870 | Switzerland | July 16, 1949 |